United States Patent [19]
Nakagome

[11] 3,856,559
[45] Dec. 24, 1974

[54] METHOD OF MANUFACTURING COMPOSITE FILMS OF HEAT RESISTING POLYMERS

[75] Inventor: Keisuke Nakagome, Osaka, Japan

[73] Assignee: Nitto Electric Industrial Co., Ltd., Osaka, Japan

[22] Filed: Sept. 28, 1972

[21] Appl. No.: 293,181

[30] Foreign Application Priority Data
Sept. 30, 1971 Japan.............................. 46-76996

[52] U.S. Cl............ 117/119.6, 117/138.8 N, 156/3, 156/331, 161/214, 161/227, 260/77.5 CH
[51] Int. Cl.............................................. B44d 1/44
[58] Field of Search................... 156/307, 327, 331; 161/227, 214; 117/62, 68.5, 118, 119.6, 138.8 B, 138 N, 145, 161 P, 161 UN; 260/77.5 CH

[56] References Cited
UNITED STATES PATENTS
3,361,589  1/1968  Lindsey................................ 117/118
3,397,253  8/1968  Merten et al. ....................... 260/830
3,645,978  2/1972  Craven......................... 260/77.5 CH

*Primary Examiner*—William A. Powell
*Assistant Examiner*—Brian J. Leitten
*Attorney, Agent, or Firm*—Sughrue, Rothwell, Mion, Zinn & Macpeak

[57] ABSTRACT

A method of manufacturing a heat-adhesive composite film of heat resisting polymers, such as polyimides, comprising applying a solution of a cresol-soluble, heterocyclic ring-containing polymer to at least one surface of a heat resisting support film formed from a solution of a heterocyclic ring-containing polymer which is soluble in aprotic polar solvents, such as N-methylpyrrolidone, dimethylacetamide and dimethylformamide, but insoluble in cresols, and evaporating the solvent in the coating layer until the residual solvent content is reduced to 20% by weight or less based on the weight of the solid content in the solution to form a heat-adhesive layer, is disclosed.

8 Claims, No Drawings

METHOD OF MANUFACTURING COMPOSITE FILMS OF HEAT RESISTING POLYMERS

BACKGROUND OF THE INVENTION

1. Field of the Invention

This invention relates to a method of manufacturing composite films of heat resisting, heterocyclic ring-containing polymers forming a heat coating layer on at least one surface of heat resisting support films.

2. Description of the Prior Art

Adhesives such as fluorocarbon resins, one component system polyamide-imide adhesives, pressure-sensitive silicone resins, epoxy resins and modified substances thereof, nitrile rubber-phenolic resin mixtures and the like, have been conventionally used to obtain composite films of heat resisting, heterocyclic ring-containing polymers, such as polyimides or polyamide-imides.

Fluorocarbon resins, as disclosed in Japanese Pat. Publication No. 5917/70, are good adhesives for polyimides and are widely utilized, but they have high melting points and should be heated to temperatures considerably higher than their melting points to exhibit sufficient adhesion. Therefore, in preparing composite sheets consisting of an electric conductor layer interposed between layers of a polyimide resin, such as flexible printed circuits, special attention should be paid to prevent the copper foil from shifting due to fluidization on hot pressing. The fluorocarbon resins have additional disadvantages in that they are inadequate for use with polyamide-imides, which are inferior in heat resisting properties to polyimides, because of the high adhesive temperatures of the fluorocarbon resins and because of the high price of fluorocarbon resins.

Thermosetting epoxy resins and modified substances thereof, nitrile rubber-phenolic resin mixtures and the like are inferior in heat resisting properties to heterocyclic ring-containing polymers and, if modified to enhance their heat resisting properties, they become less flexible and become inadequate to adhere film materials.

The inventors of the present invention investigated methods of binding heat resisting, heterocyclic ring-containing polymer films to substrates using a polyamide-imide adhesive or a solution of a polymer of the same kind as the support film, and found that these adhesives are inconvenient to handle, are so hygroscopic that a thin coating layer thereof becomes translucent immediately after application, and soften the film in drying to make it uneven. Such an adhesive, in addition, softens the film remarkably when heated to a high temperature to obtain a high adhesion thereby causing an uneven shrinkage of the film, requires a long period of time for evaporation of the solvent and, when dried at a low temeprature, leaves a large quantity of solvent which causes foaming or bubbling of the adhesive layer during hot pressing to a substrate.

We also found that the life of a composite sheet having an adhesive layer of a solution of a polyamide-imide dissolved in an aprotic polar solvent is short due to migration of residual solvent into the support film and absorption of moisture and adhesion during storage is lost.

SUMMARY OF THE INVENTION

According to the present invention there is provided a heat-adhesive composite film using a solution of a heterocyclic ring-containing polymer which is different in physical properties from the polymer forming the support film. That is, the present invention provides a method of manufacturing a composite film of a heat resisting polymer having a heat adhesive layer thereon comprising applying a solution of a cresol-soluble, heterocyclic ring-containing polymer to at least one surface of a heat resisting support film formed from a solution of a heterocyclic ring-containing polymer which is soluble in aprotic polar solvents, such as N-methylpyrrolidone, dimethylacetamide, dimethylformamide and dimethylsulfoxide, but insoluble in cresols, and evaporating the solvent in the coating layer until the residual solvent content is reduced to 20% by weight or less, based on the weight of the solid content, to form the heat-adhesive layer on the support film.

DETAILED DESCRIPTION OF THE INVENTION

Heterocyclic ring-containing polymers have, in general, excellent heat resisting properties and exhibit little decrease in electrical and mechanical properties at conventionally used temperatures of above 155°C. These polymers are synthesized in aprotic polar solvents, such as N-methylpyrrolidone (NMP), dimethylacetamide (DMAC), dimethylformamide (DMF) and dimethylsulfoxide (DMSO), and the resulting solution is cast and dried to form a film product. In the present invention, as a polymer to form the support films, heterocyclic ring-containing polymers which are soluble in an aprotic polar solvent as described above but insoluble in o-, m-, and p-cresols and mixtures thereof are used and, as a polymer to form the adhesive layer, heterocyclic ring-containing polymers which are soluble in cresols are used. The cresol-insoluble, heterocyclic ringcontaining polymers are exemplified by polyimides obtained by the condensation of an aromatic tetracarboxylic acid dianhydride, such as pyromellitic dianhydride, 3,4,3',4'-benzophenone tetracarboxylic dianhydride, 1,2,5,6-naphthalene tetracarboxylic dianhydride, 3,3',4,4'-diphenyl tetracarboxylic dianhydride, bis(3,4-dicarboxyphenyl)ether dianhydride, bis(3,4-dicarboxyphenyl)methane dianhydride, bis(3,4-dicarboxyphenyl)sulfone dianhydride, etc., with a diamine, such as 4,4'-diamino-diphenyl ether, m-phenylene diamine, p-phenylene diamine, 4,4'-diamino-diphenyl methane, benzidine, 4,4'-diamino-diphenyl sulfide, 4,4'-diaminodiphenyl sulfone, etc., and polyamide-imides obtained by the condensation of an aromatic tricarboxylic acid anhydride, such as trimellitic anhydride,4-carboxydiphenylmethane-3',4'-dicarboxylic anhydride, 3-carboxydiphenylmethane-3',4'-dicarboxylic anhydride, 4-carboxydiphenylether-3',4'-dicarboxylic anhydride, 3-carboxydiphenylether-3',4'-dicarboxylic anhydride, 4-carboxydiphenylketone-3',4'-dicarboxylic anhydride, 3-carboxydiphenylketone-3',4'-dicarboxylic anhydride, etc., with an organic diisocyanate, such as diphenylmethane-4,4'-diisocyanate, p-phenylenediisocyanate, 2,4-tolylenediisocyanate, 1,5-naphthalenediisocyanate, diphenylether-4,4'-diisocyanate, hexamethylenediisocyanate, cyclohexane-1,4-diisocyanate, p-phenylenedithioisocyanate, diphenylmethane-4,4'-dithioisocyanate, etc. The insolubility in cresols is ascertained by adding cresols to the polymer solution to form precipitates and, more exactly, by adding the precipitates to cresols and allowing the mixture to stand stationary, optionally with heating.

THe cresol-soluble, heterocyclic ring-containing polymers are exemplified by poly (parabanic) acid,

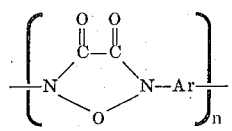

which is described in Angew. Chem. Internat. Edit., Vol 10 (1971) No. 5 p299, polyhydantoin, copolymers of polyhydantoin and polyamide-imides such as polyamide-imides obtained by the reaction of tricarboxylic acid anhydrides with organic diisocyanates, etc., copolymers of polyhydantoin and alicyclic imide ring-containing polyimides obtained by reaction of an alkanetetracarboxylic acid, e.g., 1,2,3,4-butanetetracarboxylic acid, 1,2,3,4-butanetetracarboxylic dianhydride, 1,2,3,4-butanetetracarboxylic anhydride, etc., with a diamine, such as 4,4'-diaminodiphenylmethane or the diamines described above. The reaction is generally conducted in cresols to obtain a solution of cresol-soluble polymers.

In the present invention, normally non-tacky but heat-adhesive composite films are manufactured by applying a solution of a cresol-soluble, heterocyclic ring-containing polymer to the surface of a support film formed from a solution of a cresol-insoluble, heterocyclic ring-containing polymer and heating the coated film to evaporate the solvent in the coating layer to a residual solvent content of 20% by weight or less based on the weight of the solid content in the solution, preferably from 15 to 0.5% by weight. A residual solvent content exceeding 20% by weight based on the weight of the solid content in the solution is undesirable since foaming of the heat-adhesive layer during hot pressing to a substrate results and the hot pressing time is increased. It is sufficient, to obtain an excellent heat-adhesion, to carry out the evaporation of the solvent at a temperature somewhat lower than the boiling point of the solvent and then at a higher temperature for further elimination of the solvent. For the most commonly used solvents, evaporation will generally be at about 25° to about 200°C, preferably 80° to 190°C. It is preferred to conduct the second stage of drying at a temperature at least 10°C lower than the hot pressing temperature to be employed. Usually a hot pressing temperature of from about 200° to about 400°C will be used, preferably 230° to 350°C.

It will be clear to one skilled in the art that temperatures above and below the above ranges can be and are used, depending upon the materials involved, and the above ranges are merely exemplary.

The cresol-soluble heterocyclic ring-containing polymers employed in the present invention preferably have high degrees of polymerization, corresponding to an intrinsic viscosity in NMP at 30°C of at least 0.35, desirably at least 0.4. Polymers of lower intrinsic viscosities have poor flexibility and an adhesive layer heat-adhered to a substrate would be cracked and separated from the substrate when the composite is folded at 90°. Although most of the cresol-soluble, heterocyclic ring-containing polymers are also soluble in aprotic polar solvents, in the present invention, cresol solutions of cresol-soluble polymers are used to form a heat-adhesive layer and solutions of such polymers in aprotic polar solvents are not used. It is preferred to form a heat-adhesive layer from a cresol solution, although solutions of solvents such as chlorinated hydrocarbons, aromatic hydrocarbons, esters, and mixtures of these with cresols, which are able to dissolve the heterocyclic ring-containing polymers and have no adverse effect on support films, may be used to form the heat softenable adhesive layer.

The composite films of the present invention can have a high adhesion to heat resisting polymeric films and to metals using hot pressing. This high adhesion is believed to be attributed to a good flowability of the layer due to the residual solvent in the hot melt adhesive layer and this high adhesion, especially to a film of a heterocyclic ring-containing polymer, is believed to be attributed to a high intermolecular force between the polymers forming the support film and the structurally similar heterocyclic ring-containing polymers used as adhesives.

The composite films of the present invention have an advantage that they can be stored for a long period of time without any decrease in adhesion since cresols, event though remaining in the composite films, have no hygroscopicity and no migration into the support films, as is the situation with aprotic polar solvents.

The invention will now be illustrated in greater detail by reference to the following examples which are given for the purposes of illustration.

EXAMPLE 1

A solution (A) of a highly polymerized polyamide-imide (intrinsic viscosity = 0.92) synthesized from a NMP solution of 0.1 mole of trimellitic anhydride, 0.2 mole of diphenylmethane-4,4'-diisocyanate and 0.1 mole of isophthalic acid was cast, dried and cured at 150°C, 200°C and 250°C for 30 minutes each to form a 50 micron thick polyamide-imide film (B). The resulting film (B) was coated with a m-cresol solution of a polyhydantoin having an intrinsic viscosity of 0.42, "Resistherm PH-20" supplied by Bayer A. G., dried and precured at 150°C and 220°C to obtain a composite film (C) having a hot melt adhesive layer of a thickness of 20 microns. The residual solvent in the heat softenable adhesive layer was 3.2% by weight. The resulting composite film (C) was curled slightly toward the polyhydantoin layer, although the composite film (C) was substantially smooth-surfaced. 10 cm square pieces of the aforesaid (B) and (C) with the polyhydantoin layer of (C) in contact with the new piece of (B) were hot pressed at 240°C under a pressure of 5 Kg/cm² for 5 minutes (the resulting assembly thus comprising polyamide-imide/polyhydantoin/polyamide-imide).

The adhesion strength obtained was 0.4 Kg/cm of width. After curing the resulting laminate at 240°C for 30 minutes in a dryer, the adhesion was too high to pull off film (B) from (C). A polymer precipitated from the aforesaid polyamide-imide solution (A) using methanol was insoluble in m-cresol.

COMPARATIVE EXAMPLE 1

When the polyamide-imide film (B) as described in Example 1 was coated with the polyamide-imide solution (A) as described in Example 1 to form a coating layer of a thickness of 20 microns and immediately dried at 150°C (composite film (D)), the polyamide-imide film (B) was swollen and became markedly uneven. The residual solvent content of the resulting adhesive layer was 24.7% by weight. When a piece of the polyamide-imide film (B) as described in Example 1 was superposed on the composite film (D) and hot pressed at 175°C, 5 Kg/cm², for 5 minutes, there was obtained a high adhesion, but swelling of the polyamide-imide films, non-uniform flow and foaming of the adhesive layer occurred. A similar result was obtained even when the aforesaid composite film (D) was precured at 220°C and hot pressed to the film (B) at 240°C, at a pressure of 5 Kg/cm², for 5 minutes.

EXAMPLE 2

A composite film (C) as described in Example 1 was superposed on a polyimide film, "Kapton" supplied by the E. I. du Pont de Nemours Co., Inc., of a thickness of 50.8 microns, and hot pressed at 240°C, at 25 Kg/cm², for 20 minutes to obtain a smooth, clear laminate. The adhesion strength was 0.3 Kg/cm of width.

EXAMPLE 3

A composite film (C) as described in Example 1 was superposed on a 35 micron thick electrolytic copper foil and hot pressed at 240°C, at 5 Kg/cm², for 20 minutes to obtain a copper foil laminate without any blemishes. The peel strength at 90° between the copper foil and the film was 1.5 Kg/cm of width, and when a 25 mm square piece of the laminate was soaked in a solder bath at 260°C for 20 seconds, no change was observed.

EXAMPLE 4

A conductor pattern was formed on a copper foil laminate as described in Example 3 using photoetching, then a composite film (C) as described in Example 1 was superposed thereon and hot pressed at 240°C, at 15 Kg/cm², for 20 minutes. The resulting laminate was removed from the hot press after being cooled to temperatures below 180°C. The resulting conductor pattern was completely covered by composite film (C) firmly bonded thereto. Adhesion to the unreacted copper foil was improved by a surface treatment, e.g., coating with black copper oxide or by the chromate conversion method. The former method comprises forming a film of cupric oxide by heating in a solution containing 5% of sodium hydroxide and 1% of potassium persulfate at above 100°C for about 3 to 10 minutes. The latter method comprises forming a film by washing in a solution containing 19 – 20% sulfuric acid, chromic acid and dichromic acid, or 4 – 5% of the salts thereof.

The insulating resistance between conductors was $10^{13}$ ohms or larger as measured using the IPC-FC-240 test method, and the dimensional stability between the conductors (coefficient of contraction) was within 0.5%.

EXAMPLE 5

A powdered polyhydantoin resin, precipitated from a m-cresol solution of a polyhydantoin resin (Resistherm PH-20(intrinsic viscosity=0.43)) using methanol and washed, was dissolved in methylene chloride and applied to a polyamide film (B) as described in Example 1, then dried at 70°C for 10 minutes and precured at 150°C for 30 minutes to obtain a composite film (E) having a hot melt adhesive layer of a thickness of 30 microns. The residual solvent content in the aforesaid adhesive layer was 0.5% by weight. The composite film was superposed on a polyamide-imide film (C) as described in Example 1 and hot pressed at 220°C, at 10 Kg/cm², for 20 minutes. The adhesion therebetween was too high to pull them from each other. The resulting laminate was so pliable that it withstood folding at 360°.

EXAMPLE 6

A polyamide-imide-hydantoin copolymer solution was prepared by reacting in a m-cresol solution 0.12 mole of trimellitic anhydride, 0.2 mole of diphenylmethane-4,4'-diisocyanate and 0.08 mole of a glycine derivative, such as N,N,'-bis-carboethoxymethyl-4,4'-diaminodiphenylmethane. The intrinsic viscosity of the resulting copolymer was 0.6. The copolymer solution was applied to an aromatic polyamide-imide film (B) as described in Example 1 of 50-microns thickness and dried at 150°C for 30 minutes to obtain a composite film having a heat softenable adhesive layer of a thickness of 25 microns. The residual solvent content was 15.0% by weight. The resulting composite film was superposed on the aforesaid polyamide-imide film and, after hot pressing at 175°C, at 25 Kg/cm², for 5 minutes, cured in a dryer at 220°C and 240°C for 30 minutes each. The adhesion therebetween was too high to pull them from each other.

EXAMPLE 7

A polymer precipitated using methanol from a NMP solution of a polyamide acid, "Pyre ML Varnish" supplied by the E. I. du Pont de Nemours Co. Inc. (intrinsic viscosity=1.02) was insoluble in cresols. The aforesaid polyamide acid solution was cast, dried and cured to form a 50 micron thick polyimide film (F). To the film there was applied a cresol solution of a polyimide of an intrinsic viscosity of 0.4 prepared by reacting (in m-cresol) butane-tetracarboxylic acid with 4,4'-diaminodiphenylmethane, as disclosed in Japanese Patent Publication No. 32716/1970, dried at 150°C and precured at 220°C to obtain a composite film having a hot melt adhesive layer of a thickness of 30 microns. The residual solvent content in the hot melt adhesive layer was 4.6% by weight. The resulting composite film was superposed on the aforesaid polyimide film (F) and hot pressed at 300°C under a pressure of 10 Kg/cm² for 30 minutes to obtain a high adhesion therebetween.

All of the composite films obtained in the above Examples exhibited little decrease in adhesive properties during storage for 3 months.

In accordance with the present invention, as fully illustrated above, it is possible to obtain a laminate having high heat resisting properties and a high adhesion between layers because of the use as an adhesive of a heterocyclic ring-containing polymer which has a similar structure to the polymer forming a support film. Although cresol-soluble heterocyclic ring-containing polymers are in general somewhat inferior in heat resisting properties to those heterocyclic ring-containing polymers which are soluble in aprotic polar solvents but insoluble in cresols, the adhesive layer formed from such cresol-soluble polymers exhibits high heat resisting properties since the adhesive layer is enclosed between a support film and a substrate and, thereby, protected from attack by oxygen causing a decrease in heat resisting properties.

The composite films in accordance with the present invention are conveniently used for lamination with films of heat resisting, heterocyclic ring-containing polymers, such as those of polybenzoimidazols, polybenzoxazols, polybenzimidazolimides, polyamidebenzoimidazols, polyquinazolones, polybenzoxazinones, polyindolones and the like, and especially of polyimides and polyamide-imides, but use of the composite films is not restricted thereto. The composite films can be suitably used also for applications such as flexible printed circuits by lamination with a metallic foil and wrapping materials for flat cables and electric conductors.

While the invention has been described in detail and with reference to specific embodiments thereof, it will be apparent that various changes in a modifications can be made therein without departing from the spirit and scope thereof.

What is claimed is:

1. A method of manufacturing a heat adhesive composite film of a heat resisting polymer having thereon a heat softenable adhesive layer comprising
   applying a solution of a cresol-soluble, heterocyclic ring-containing polymer to at least one surface of a heat resisting support film formed from a solution of a heterocyclic ring-containing polymer which is insoluble in a cresol but soluble in an aprotic polar solvent,
   drying said coated layer to a residual solvent content of 20% by weight or less based on the weight of the solid content in said coated layer.

2. The method of claim 1, wherein said cresol-soluble, heterocyclic ring-containing polymer is polyhydantoin, copolymers of polyhydantoin and polyamide-imides, copolymers of polyhydantoin and alicyclic imide ring-containing polyimides, or poly(-parabanic) acid and wherein said cresol-insoluble, aprotic polar solvent soluble heterocyclic ring-containing polymer is a polyimide or a polyamide-imide.

3. The method of claim 2, wherein said cresol-insoluble, aprotic polar solvent soluble heterocyclic ring-containing polymer is the condensation product of an aromatic tetracarboxylic acid dianhydride and a diamine, or the condensation product of an aromatic tricarboxylic acid anhydride with an organic diisocyanate.

4. The method of claim 3, wherein said aromatic tetracarboxylic acid dianhydride is pyromelitic dianhydride, 3,4,3',4'-benzophenone tetracarboxylic dianhydride, 1,2,5,6-naphthalene tetracarboxylic dianhydride, 3,3',4,4'-diphenyl tetracarboxylic dianhydride, bis(3,4-dicarboxyphenyl)ether dianhydride, bis(3,4-dicarboxyphenyl)methane dianhydride, or bis(3,4-dicarboxyphenyl) sulfone dianhydride, wherein said diamine is 4,4'-diaminodiphenylether, m-phenylene diamine, p-phenylene diamine, 4,4'-diaminodiphenyl methane, benzidine, 4,4'-diamino-diphenyl sulfide, or 4,4'-diamino-diphenyl sulfone, wherein said aromatic tricarboxylic acid anhydride is trimelitic anhydride, 4-carboxydiphenylmethane-3',4'-dicarboxylic anhydride, 3-carboxydiphenylmethane-3',4'-dicarboxylic anhydride, 4-carboxydiphenylether-3',4'-dicarboxylic anhydride, 3-carboxydiphenylether-3',4'-dicarboxylic anhydride, 4-carboxydiphenylketone-3',4'-dicarboxylic anhydride, or 3-carboxydiphenylketone-3',4'-dicarboxylic anhydride, and wherein said organic diisocyanate is diphenylmethane-4,4'-diisocyanate, p-phenylenediisocyanate, 2,4-tolylenediisocyanate, 1,5-naphthalenediisocyanate, diphenylether-4,4'-diisocyanate, hexamethylenediisocyanate, cyclohexane-1,4-diisocyanate, p-phenylenedithioisocyanate, or diphenylmethane-4,4'-dithioisocyanate.

5. The method of claim 1, wherein aprotic polar solvent is N-methyl pyrrolidone, dimethylacetamide, dimethylformamide, or dimethylsulfoxide.

6. The method of claim 1, wherein said residual solvent content is from 15 to 0.5% by weight.

7. The method of claim 1, wherein said drying of said coated layer to a residual solvent content of 20% by weight or less is initially at a first temperature lower than the boiling point of said solvent and subsequently at a second temperature of at least 10°C lower than the temperature of heat pressing said hot-melt adhesive layer, which second temperature is higher than the first temperature.

8. The method of claim 1, wherein said cresol-soluble heterocyclic ring-containing polymers have an intrinsic viscosity in N-methyl pyrrolidone at 30°C of at least 0.35.

* * * * *